United States Patent [19]

Fabry et al.

[11] 4,011,541
[45] Mar. 8, 1977

[54] SINGLE WIRE SYSTEM WITH DELAY SWITCHING CIRCUIT FOR SELECTIVE CONTROL OF NAVIGATION AND STROBE LIGHTS

[76] Inventors: Lloyd W. Fabry, 1120 Manor Drive, Wilmette, Ill. 60091; Thomas Vinton Brame, 2715 N. 77th Ave., Elmwood Park, Ill. 60635

[22] Filed: June 20, 1975

[21] Appl. No.: 588,785

[52] U.S. Cl. .................................. 340/25; 340/76; 340/331; 340/332; 340/77; 340/105; 315/241 S; 240/7.7

[51] Int. Cl.² .......................................... G08E 5/00

[58] Field of Search ............. 340/25, 331, 332, 76, 340/77, 89, 27 NA; 240/7.7; 315/241 S, 200 A, 201

[56] References Cited
UNITED STATES PATENTS

| | | | |
|---|---|---|---|
| 3,282,059 | 4/1958 | Adler | 340/25 |
| 3,283,206 | 11/1966 | Utt et al. | 315/200 A |
| 3,551,744 | 12/1970 | Keller et al. | 340/331 |
| 3,676,736 | 7/1972 | Starer | 340/25 |
| 3,873,962 | 3/1975 | Eggers | 340/25 |
| 3,895,345 | 7/1975 | Elvers | 340/331 |

*Primary Examiner*—John W. Caldwell
*Assistant Examiner*—James J. Groody
*Attorney, Agent, or Firm*—Michael G. Berkman

[57] ABSTRACT

A system for controlling navigation lights and flashing anti-collision lights in the wing tips of an airplane, including a switch and circuitry constituting means for turning the anti-collision lights on and off from the cockpit of the plane without interfering with the normal operation of the navigation lights. The system functions using only a single wire to each wing tip, thereby obviating the need to install additional wiring inside the aircraft wings and fuselage.

6 Claims, 2 Drawing Figures

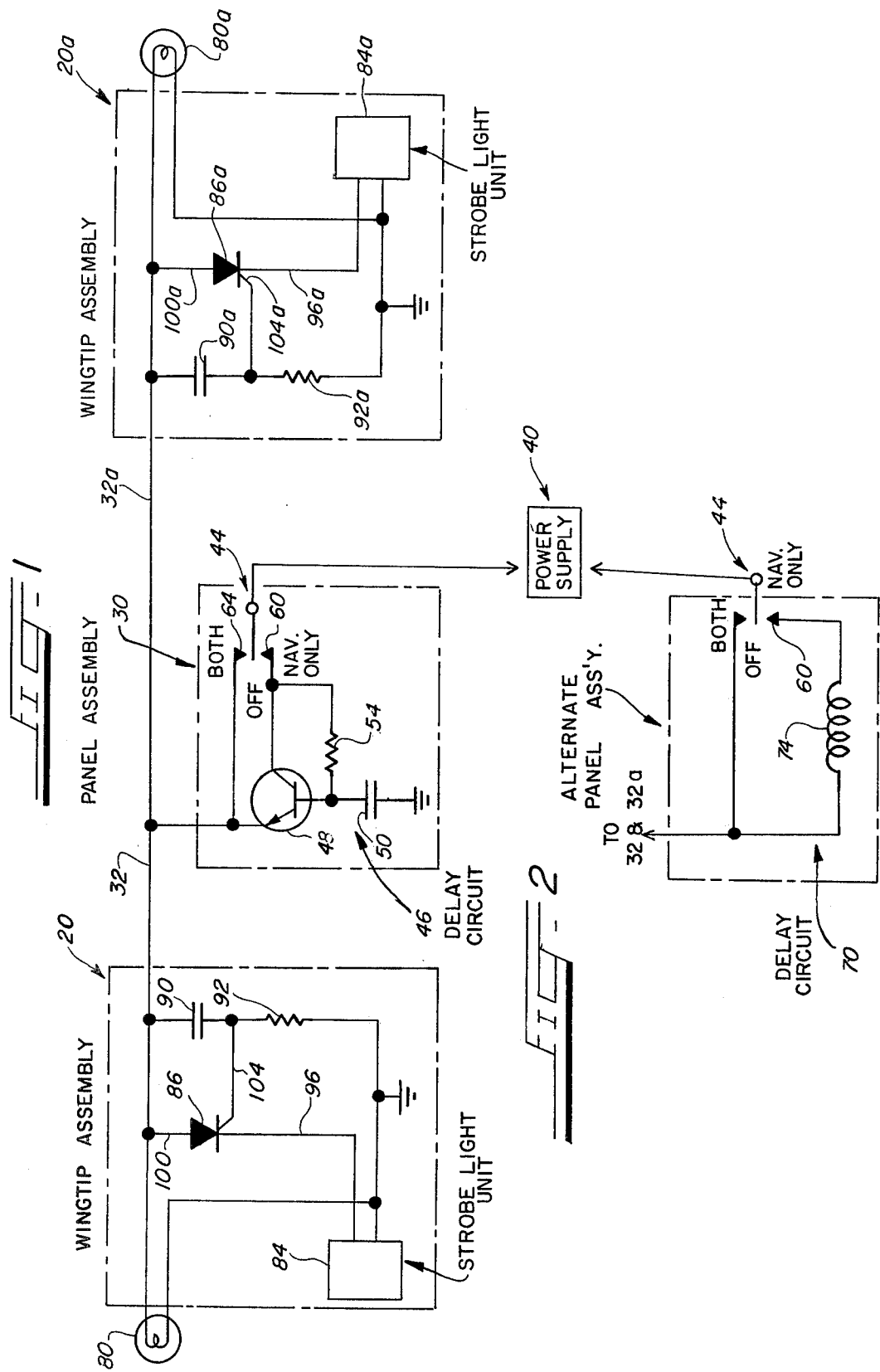

SINGLE WIRE SYSTEM WITH DELAY SWITCHING CIRCUIT FOR SELECTIVE CONTROL OF NAVIGATION AND STROBE LIGHTS

BACKGROUND OF THE INVENTION

Airplanes are conventionally provided with lighting systems which include wing tip mounted navigation lights and anti-collision lights. It is a requirement of the controlling federal agency that the anti-collision lights be provided with means whereby they may be turned off and the navigation lights left on when a aircraft is flown in clouds or fog. The continued operation of the flashing anti-collision lights under the environmental conditions described may be responsible for producing "flicker vertigo" and/or spacial disorientation.

Since aircraft of the type in which the present invention finds utility generally have only a single wire extending to each wing tip to power the lights, it has heretofore been necessary partially to disassemble the aircraft wings and fuselage in order to install additional wiring so that the wing tip anti-collision lights may be controlled, as required. The type of anti-collision lights most commonly used is the gas discharge tube "strobe light" which requires a special power supply to raise the 12 or 24 volt aircraft power output to approximately the 400 volts which is needed to ignite or fire the strobe tube. Two general types of wing tip strobe light installations are generally in use. The first and most common has a single power supply centrally mounted in the fuselage and requires the installation of special high voltage cables extending past the wing fuel tanks and out to the wing tip mounted flash tubes. The second system in use utilizes a high voltage supply and flash tube mounted in each wing tip but still requires the installation of additional wiring in the wings so that the strobes can be turned off and the navigation lights left on.

It is to the solution of the problem of providing effective control of the strobe lights while not interfering with the illumination of the navigation lights that the present invention is directed. In accordance with the invention there is provided an improved electrical and electronic control system in which a switch and associated circuitry constitute effective means for turning the anti-collision lights on and off from the cockpit of the plane without interferring with the normal operation of the lights. The system of the invention functions using only a single wire to each wing tip, thereby obviating any need to install additional wiring inside the aircraft wings and fuselage.

SUMMARY OF THE INVENTION

In accordance with the practice of the invention there is provided a modified panel assembly which includes a switch selectively positionable for operating both the navigation lights and the anti-collision lights simultaneously, for operating the navigation lights alone, and including an "off" position. In the switch position which causes both light systems to operate, the circuitry produces an almost instantaneous rise in voltage delivered to the lamp elements. In the switch position for lighting only the navigation lights, the circuitry provides only a relatively slow rise in voltage. The difference in the voltage rise rate is sensed at the lighting elements in the wing tips and ensures that the proper and desired mode of operation is achieved.

A principal electrical feature of the invention is the incorporation of a silicon controlled rectifier and its utilization as an electronic switch in the circuit of the strobe light or anti-collision lights. A related feature is the incorporation in the circuitry in the panel assembly at the cockpit of a delay circuit associated with the "navigation lights only" position of the selector switch. The manner in which these features and others contribute to and achieve the purpose of the invention will be set forth more fully in the paragraphs below and will be unerstood upon consideration of the following descriptive material in conjunction with the drawings.

BRIEF DESCRIPTION OF THE DRAWINGS

The invention is described more fully and in greater detail herebelow by way of a specific example with reference to the accompanying drawings in which:

FIG. 1 is a schematic drawing illustrating the electronic system of the invention including the circuitry at each wing tip and in the panel assembly located in the cockpit; and FIG. 2 illustrates an alternative electronic delay circuit for incorporation in the panel assembly.

DESCRIPTION OF PREFERRED EMBODIMENT

In accordance with the preferred embodiment of the invention, the aims and objects are accomplished, as indicated schematically in FIG. 1, by providing a light control system which includes a wing tip assembly 20 and 20a at each opposed wing tips of the plane, and panel assembly 30 in the plane cockpit. A single wire 32 and 32a connects each wing tip assembly 20 and 20a to the panel assembly 30 as well as to the airplane (12-volt) power supply 40, the connections to the power supply and to each wing tip assembly being controlled through a multi-position switch 44.

In addition to the switch 44 which serves as an operation mode selector switch, the panel assembly 30 includes a delay circuit 46 which, in the preferred embodiment of the invention illustrated in FIG. 1 includes a power transistor 48, a capacitor 50 and a resistor 54, all contained in the "NAV.ONLY" position 60 circuitry of the selector switch 44. In the navigation lights and anti-collision lights position, that is, the "BOTH" position 64 of the selector switch 44, the "delay circuit" 46 is by-passed and power is fed directly from the power supply 40 to each of the wing tip assemblies 20 and 20a. In a second embodiment of the panel assembly, shown in FIG. 2, the delay circuit 70, interposed in the "NAV.ONLY" position 60 of the selector switch 44 constitutes a coil 74.

Referring again to FIG. 1, each wing tip assembly 20 and 20a of the invention includes a navigation light bulb 80 and 80a, a strobe light unit 84 and 84a, a silicon controlled rectifier 86 and 86a, a capacitor 90 and 90a, and a resistor 92 and 92a. In the operation of the lighting system of the invention, as described more fully herebelow, an almost instantaneous rise in voltage occurs at the silicon controlled rectifier (SCR) 86 and 86a when the selector switch 44 is in the "BOTH" position 64. In contrast, when the selector switch is in the "NAV.ONLY" position 60 the effect of the "delay" circuit 46 or 70 is to slow the rise in voltage at the SCR 86 and 86a so that the SCR does not reach a trigger voltage. That is, the SCR acts as an electronic switch between the cathode 96 or 96a and the anode 100 or 100a so that the circuit between the anode and cathode elements is open (SCR non-conducting) until a positive pulse of sufficient amplitude is applied to the gate 104 or 104a whereupon the "switch" closes and the SCR is rendered conductive until the current supply from the anode 100 to the cathode 96 is interrupted. When such a current interruption is effected, the switch (SCR 86 or 86a) opens and remains open until another positive gate pulse is received. The operation of the circuitry of the invention will be better understood upon consideration of the following additional description.

OPERATION

The manner in which the invention is effective to control, selectively, the operation of the navigation lights and anti-collision lights simultaneously, or the illumination of only the navigation lights, will become evident from the following description of the operation of the circuitry. With the selector switch 44 in the "BOTH" position 64, electrical power from the airplane power supply 40 is connected directly to the conductors 32 and 32a feeding the respective wing tip assemblies 20 and 20a. The full voltage supply is applied instantaneously to the navigation lamps 80 and 80a as well as to the silicon controlled rectifiers 86 and 86a and their associated capacitors 90 and 90a and resistors 92 and 92a. The capacitors 90 and 90a are charged rapidly to develop an SCR firing voltage across the respective resistors 92 and 92a and on the gate 104 and 104a of the SCR elements 86 and 86a, whereupon these SCR's are rendered conductive to supply current to the strobe lights 84 and 84a. The supply of current through the SCR continues until the selector switch 44 is moved to the "OFF" position.

When the selector switch 44 is in the "NAV.ONLY" position 60, the delay circuit 46 is interposed into the system and current to the conductors 32 and 32a must pass through the power transistor 48. However, the turning on of the transistor 48 is slowed by the charging of the timing capacitor 50 through the resistor 54 in the base circuit of the transistor 48. Because of the relatively slow rise in the voltage, there is not a sufficiently rapid flow of current to the capacitors 90 and 90a in the wing tip assembly circuits to raise the voltage across the capacitors to a level which would render the SCR's 86 and 86a conductive. Accordingly, the navigational lights 80 and 80a turn on, but the strobe lights 84 and 84a remain off. As previously indicated, an equivalent slow rise in voltage is achieved through the use of a coil 74 (FIG. 2) substituted for the power transistor 48, capacitor 50 and resistor 54 in the delay circuit of FIG. 1.

In the event of an interruption in the aircraft power supply, when power is restored, the mode of operation followed will be that which is selected by the control switch 44.

It will be appreciated that the present invention provides a simple yet highly effective apparatus for selectively controlling the operation of navigation lights and anti-collision lights without rewiring or adding additional wires or electrical conductors in the fuselage or wings of the aircraft.

While preferred embodiments of the novel electrical control system of the invention have been illustrated and described, it is understood that the same is capable of modification and that such modifications may be made without departure from the spirit and scope of the invention as defined in the appended claims.

What is claimed is:

1. In an aircraft lighting system including a D.C. voltage power supply in which the metal air frame is ground, wing tip mounted navigation lights and anti-collision strobe lights, and circuit means for illuminating the navigation lights and for activating the anti-collision strobe light units, the improvement comprising:
   means for selectively turning off and turning on the anti-collision lights while maintaining the navigation lights illuminated, said improvement obviating any need to disassemble airplane wing and fuselage components for the installation of supplemental wiring,
   and constituting electrical power control and first switching means for selectively supplying operating voltage to the navigation lights and strobe light units together, and the navigation lights alone, and operable using a single wire conductor only from said D.C. voltage power supply to the site of said navigation lights and said strobe light units for delivery of lamp-illuminating power thereto, said improvement including:
   second switching means interposed between and interconnecting said circuit means and said strobe light units for controlling the application of voltage from the power supply thereto;
   delay circuit means for controlling actuation of said second switching means,
   said first switching means being positionable between a first position in which said delay circuit means is by-passed to establish a circuit flow path directly from the D.C. voltage power supply to both the navigation lights and the strobe light units, thereby to deliver to said aircraft lighting system voltage effective to energize concurrently both said navigation lights and said anti-collision strobe units, and a second position in which said delay circuit means in interposed electrically between said power supply and said second switching means to maintain said second switching means open to preclude the application of voltage to said strobe light units but not interfering with the illumination of said navigation lights.

2. The improvement as set forth in claim 1 wherein said second switching means comprises a silicon controlled rectifier, and a charging circuit operable to develop and to deliver to a gating element of said silicon controlled rectifier a voltage effective to render said silicon controlled rectifier conductive, thereby to supply current to the anti-collision strobe light units.

3. The improvement as set forth in claim 2 wherein said delay circuit means includes means for controlling and limiting the rate of voltage build up in said charging circuit, thereby to preclude the development of a voltage level operable to energize and render said silicon controlled rectifier conductive, whereby illumination of said strobe lights is prevented.

4. The improvement as set forth in claim 3 wherein said means for controlling and limiting the rate of voltage build up in said charging circuit includes a power transistor in combination with a timing capacitor and a bias resistor.

5. The improvement as set forth in claim 3 wherein said means for controlling and limiting the rate of voltage build up in said charging circuit includes a current-limiting coil connected in series between said power supply and said charging circuit.

6. The improvement as set forth in claim 4 wherein said charging circuit includes a charging capacitor connected to and developing a positive voltage at a gating element of said silicon controlled rectifier to render said silicon controlled rectifier conductive.

* * * * *

UNITED STATES PATENT OFFICE
CERTIFICATE OF CORRECTION

Patent No. 4,011,541                    Dated March 8, 1977

Inventor(s) Lloyd W. Fabry et al.

It is certified that error appears in the above-identified patent and that said Letters Patent are hereby corrected as shown below:

Column 4, line 33, after the word "strobe" insert -- light --.

Signed and Sealed this

Tenth Day of May 1977

[SEAL]

Attest:

RUTH C. MASON
*Attesting Officer*

C. MARSHALL DANN
*Commissioner of Patents and Trademarks*